Feb. 8, 1955 — E. L. KRIEBLE — 2,701,624
GAS CLEANER
Filed April 16, 1951
FIG. 1
FIG. 2
FIG. 3
FIG. 4
FILLED WITH GRANULAR MATERIAL
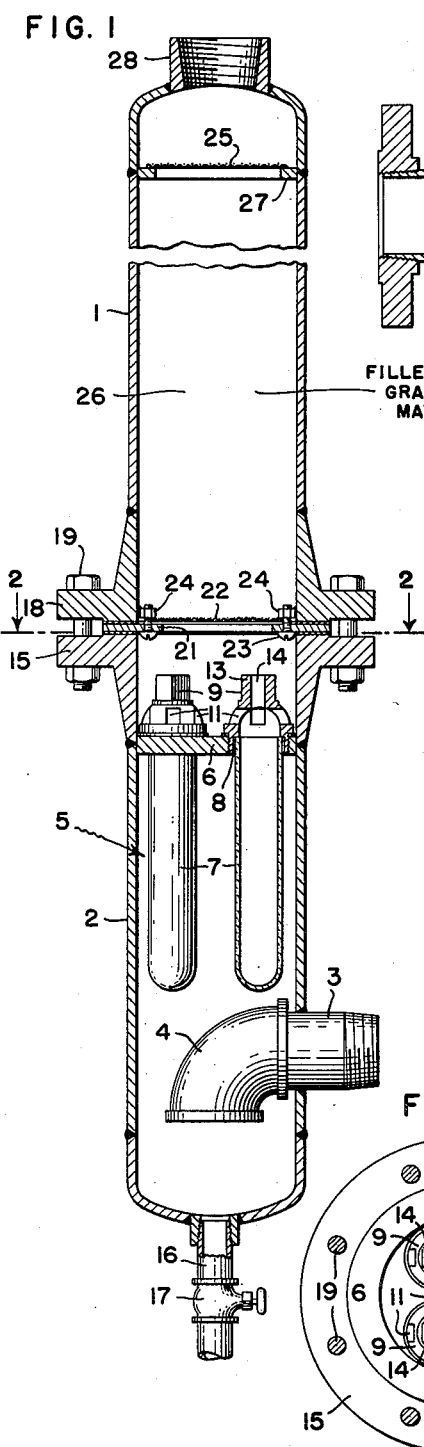
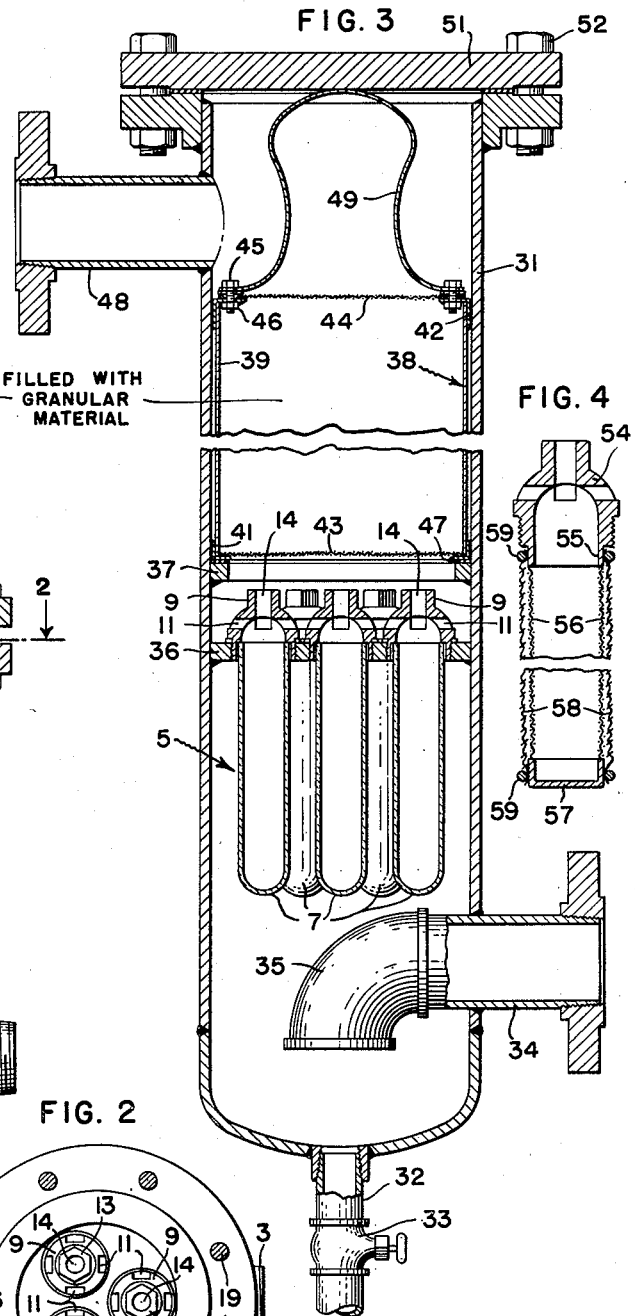
INVENTOR.
ELVIN L. KRIEBLE
BY
ATTORNEY.

United States Patent Office 2,701,624
Patented Feb. 8, 1955

2,701,624

GAS CLEANER

Elvin L. Krieble, Lansdale, Pa., assignor to Selas Corporation of America, Philadelphia, Pa., a corporation of Pennsylvania Application April 16, 1951, Serial No. 221,204

3 Claims. (Cl. 183—70)

The present invention relates to gas purifiers and more particularly to apparatus for removing liquids, dirt and vapors from gas.

In many industrial applications it is necessary to use air or other gases that are free from various contaminants. Some types of contaminants such as oil or water in liquid phase can be removed by one type of filtering element while an entirely different type of element is needed to remove these materials in vapor phase.

It is an object of the invention to provide gas filtering or purifying apparatus that will remove from the gas solid particles as well as various liquids and vapors that are undesirable.

It is a further and more specific object of the invention to provide apparatus for the continuous removal of dirt, oil, water and oil vapor from compressed air and other gases.

According to the invention there is provided a chamber through which the air or other gas to be treated is passed. Located in this chamber in the path of the gas are a plurality of filter candles which remove solid matter and liquids. The gas is then passed through an adsorbing material which removes any oil vapor that may be carried thereby. The apparatus is simple in construction and efficient in its operation. The various filtering elements of the apparatus may be easily removed for cleaning and replacement.

For purposes of this description, air will be described as the gas being treated although it will be apparent that other gases may be similarly treated by the same apparatus.

The various features of novelty which characterize this invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

Figure 1 is a sectional view of one embodiment of the invention.

Figure 2 is a view taken on line 2—2 of Figure 1.

Figure 3 is a sectional view of another emboliment of the invention, and

Figure 4 is a section of a different form of filter element.

Referring to Figure 1 of the drawings, there is shown a vertical extending chamber formed of an upper part 1 and a lower part 2. These parts are preferably made of metal and may be cast in the shape shown or they may be made from a number of elements that are welded together. The latter construction is generally to be preferred since it is equally as strong as a casting and is cheaper to fabricate. The lower portion 2 is provided with an inlet 3 for the air to be cleaned, which inlet has a downturned end indicated at 4. Located above the inlet are a plurality of filter elements 5. As shown in Figure 2 there are provided three of the filter elements which are mounted in a partition 6, extending across that portion of the chamber formed by the part 2. Each of the filter elements is provided with a separating membrane indicated at 7 and which is shown herein as being a microporous, ceramic filter candle. Each membrane or candle is attached by cement 8 to a casting 9 that is threaded into an opening provided in the partition 6. Preferably gaskets are used between the flange on the casting and the partition 6, in order to provide a gastight joint between these two parts. The filter candle themselves can be of a standard commercial type that are treated to render them hydrophobic, but will permit them to pass a gas. Usually, these candles will also pass oil or water in vapor form while the liquid phase is repelled. Each of the castings 9 is provided with a number of openings 11, extending through the sides thereof and an opening 14 extending through the top which is indicated at 13. As shown in Figure 2 the top is hexagonal in shape so that a standard socket wrench can be used to insert and remove the filter assembly from the partition. The upper end of the part 2 is provided with a radially extended flange 15, and the lower end thereof has an outlet or drain 16 provided with a valve 17. This valve is shown as being manually operated although it could be operated automatically by any conventional means in response to the accumulation of liquid in the lower portion of the chamber. The upper part 1 is provided at its lower end with a radially extending flange 18 that is attached to the flange 15 by suitable bolts 19. Gaskets are used between the flanges in order that parts 1 and 2 are joined together with a pressure tight connection. Attached to the lower end of part 1, and between the flanges 15 and 18, is an annular member 21 that has a relatively fine mesh screen 22 attached across its central opening. The annular member and screen are held in position against the lower end of part 1 by screws 23 that extend through the member, and which are threaded into nuts 24 that are welded to the inner surface of part 1. The screen 22, along with another screen 25, forms a compartment 26 that is filled with a granular adsorbent material. The screen 25 is welded to an annular ring 27 which in turn is fastened to the interior of part 1 just below an outlet 28 in the closed end thereof. The compartment 26 is filled with a granular material having the property of adsorbing oil vapor from the air. A material that has been found satisfactory for this purpose is activated carbon.

One of the principal uses of an apparatus of the type disposed herein is to clean air for instrument use or for other critical pneumatic operations. Air coming from a compressor will frequently carry along with it dirt, oil and water droplets as well as oil vapor. These contaminants must be removed before the air is in satisfactory condition for use.

In operation the air to be purified is introduced into the apparatus through inlet 3 and passes upwardly through the filtering membranes or candles 7. In passing through these membranes water, free oil, water-oil emulsions and dirt are removed from the air without a significant drop in pressure. This is, in effect, a mechanical operation. Oil vapor is not removed by the membranes since such vapor has the characteristics of a gas. This vapor is adsorbed by the activated carbon contained in chamber 26 so that clean, dry, air is delivered through the outlet 28 to be used in any process requiring air of this type.

Apparatus of the type disclosed herein can be made for use in gas lines of almost any pressure. While the filtering elements are relatively fragile, they are capable of withstanding a pressure drop of several pounds. Since the pressure at the inlet and at the outlet of the apparatus is substantially the same, the only pressure differential that they must withstand is the actual pressure drop across the membrane 7 due to the filtering action. The capacity of this device will vary with the number of filter elements, or assemblies 5, that are used. For example, the apparatus shown in Figure 1 has three of the filter assemblies and has a free air capacity of 250 C. F. M. maximum. For larger sizes, the construction used varies somewhat. The apparatus for Figure 3 is provided with seven filter assemblies with a free air capacity of 500 C. F. M.

The embodiment of the invention of Figure 3 is enclosed in a cylindrical housing 31 which forms a container for the apparatus and which is closed at the bottom and open at the top. The bottom of the container has a drain 32 which is controlled by a valve 33. Located just above the bottom is an inlet 34, similar to the inlet 3 and which has a downturned end 35. Air coming through the inlet travels upwardly through a number of filter assemblies 5 that are identical with those previously described. The castings 9 of these assemblies are threaded into openings provided in a partition 36 that extends across the interior of the container. Located above the partition, and welded to the interior wall of the chamber, is an annular ring 37 which, in effect, forms an internal shoulder in the container. This ring serves to support a canister 38 whose sides are formed of a cylinder of sheet metal 39. The upper and lower ends of the cylindrical member 39 are provided with reinforcing angle members 41 and 42, respectively. The bottom of the canister is formed by a screen 43 which is suitably welded around its edges to the horizontal flange of the angle 41. In a similar manner, the top of the canister is formed by a screen 44 that is attached to the horizontal flange of the angle 42. The screen 43 is rigidly held in place while the screen 44 is removable so that the canister can be filled with the granular material that is preferably activated carbon. To this end there are provided bolts 45 which extend through the edges of the screen and are received by nuts 46 that are spot welded to the lower surface of the flange 42. As shown in the drawings, there is also provided a combination spring strip and handle 49 which is fastened to the canister by two of the bolts 45. This handle is engaged by a top 51 for the apparatus which is held in place by bolts 52. When the top is fastened into position, it will act through the spring handle to force the lower end of the canister against the flange 37 in order to provide a pressuretight joint between the lower end of the canister and the flange. This insures that all of the air traveling through the apparatus will pass through the canister rather than around its edges.

This apparatus operates in exactly the same manner as that described above. The air enters the inlet and travels through the filter assembly 5, where dirt and the liquid phase contaminants are removed. The air then passes through the activated carbon in the canister to have the oil vapor removed. Clean air is delivered through the outlet 48 of the apparatus.

In the invention as described above, each of the filter assemblies 5 was shown as including a filtering membrane 7 in the form of a ceramic filter candle. In most cases a membrane of that type is desirable since it has rigidity, and the porosity thereof can be accurately controlled. In some cases, however, it may be desirable to use a membrane for removing the liquid phase contaminants from the gas which is less rigid. A membrane of this type is disclosed in Figure 4.

In that figure there is provided a casting 54 similar to the castings 9 described above except that this casting is provided with a downwardly extending flange 55. To the lower end of this flange there is attached in any suitable manner the upper end of a cylindrical screen 56, the lower end of which is fastened to a cup 57. Thus the casting, screen and cup form a rigid support around which is wrapped a flexible membrane 58. This membrane may well be made of glass cloth which is treated in a conventional manner to render it hydrophobic. The upper end of the glass fabric is fastened to the flange 55 while the lower end of the fabric is fastened to the cup 57. As shown herein, this fastening consists of a binding strip of wire or other material indicated at 59.

From the above description, it will be seen that I have provided apparatus which is capable of removing solid, liquid and vapor contaminants from a gas that is to be cleaned. This apparatus in effect purifies the gas so that it can be used in various processes where a clean, dry, gas is required. Because of the construction of the apparatus, the adsorbent material can be readily changed when it is saturated with oil vapors. Likewise, the filter elements 5 can easily be removed for cleaning and replacement when such is necessary. This apparatus is easily constructed and has no moving parts to get out of order. It can be placed in a gas line with a minimum of alterations to the line, and by the use of only two joints.

While in accordance with the provisions of the statutes, I have illustrated and described the best form of embodiment of the invention now known to me, it will be apparent to those skilled in the art that changes may be made in the form of the apparatus disclosed without departing from the spirit and scope of the invention, as set forth in the appended claims, and that in some cases certain features of the invention may be used to advantage without a corresponding use of other features.

What is claimed is:

1. In a device for cleaning gas, the combination of a first vertically extending tubular member having a closed lower end and an open upper end, a partition having an opening therein extending across the interior of said member adjacent to the upper end and attached thereto, a hydrophobic filtering element fastened across said opening, means forming an inlet to the interior of said member below said element, drain means for said member in the lower end thereof, a second vertically extending tubular member having a closed upper end and an open lower end, a pair of perforated partitions extending across and attached to the interior of said second member at spaced points to form a compartment there between which is adapted to contain an adsorbing material, means forming an outlet through the closed upper end of said second member, and means to fasten the open ends of said members together whereby gas entering said inlet must flow through said element and said compartment to reach said outlet.

2. In a gas cleaning device, the combination of a first and a second elongated cylindrical member each having an open end and a closed end, means to fasten said members together at their open ends to form an elongated chamber, said first member being formed with an inlet adjacent to its closed end, a porous partition attached to and extending across the interior of said first member between said inlet and its open end, said second member being formed with an outlet adjacent to its closed end, a screen extending across said second member between said outlet and its open end, an annular member, a screen across the opening of said annular member, and means to fasten said annular member to said second cylindrical member with the screen extending across the open end thereof between said first and second cylindrical members.

3. In a gas cleaning device, the combination of a first and a second cylindrical member each having a flange extending radially from one end thereof, said first member having an inlet and a drain opening adjacent to the other end thereof and a partition with an opening therein rigidly fastened thereto adjacent to said one end, a filtering element, means to fasten said element across the opening of said partition, said second member being formed with an outlet at its other end and a screen mounted therein and extending across it adjacent to said outlet, an annular member, a screen fastened across said annular member, means to attach said annular member to the end of said second cylindrical member adjacent to the flange thereof whereby a compartment is formed therein between the two screens, and means to fasten said two cylindrical members together by their flanges so that a gas passing through said inlet must travel through said element and said compartment to reach said outlet.

References Cited in the file of this patent

UNITED STATES PATENTS

| Number | Name | Date |
|---|---|---|
| 808,564 | McCorkindale | Dec. 26, 1905 |
| 917,619 | Lamb et al. | Apr. 6, 1909 |
| 2,144,681 | Kraissl | Jan. 24, 1939 |
| 2,195,565 | Fricke | Apr. 2, 1940 |
| 2,207,660 | Ducker et al. | July 9, 1940 |
| 2,402,140 | Heintzelman | June 18, 1946 |
| 2,513,556 | Furczyk | July 4, 1950 |
| 2,521,785 | Goodloe | Sept. 12, 1950 |
| 2,526,782 | Thorpe | Oct. 24, 1950 |
| 2,541,838 | Shardlow | Feb. 13, 1951 |